United States Patent
Yi

(10) Patent No.: US 7,035,218 B2
(45) Date of Patent: Apr. 25, 2006

(54) METHOD OF PROCESSING CONGESTION CONDITIONS OF MTP USER PART IN SS7 NETWORK

(75) Inventor: Seung-Hee Yi, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 912 days.

(21) Appl. No.: 09/805,897

(22) Filed: Mar. 15, 2001

(65) Prior Publication Data

US 2001/0033549 A1    Oct. 25, 2001

(30) Foreign Application Priority Data

Mar. 16, 2000 (KR) ............................... 2000-13366

(51) Int. Cl.
*H04L 12/06* (2006.01)
(52) U.S. Cl. ....................................... 370/236; 370/410
(58) Field of Classification Search ................ 370/426, 370/384–385, 230–231, 236, 237
See application file for complete search history.

(56) References Cited

U.S. PATENT DOCUMENTS

| 5,550,914 A * | 8/1996 | Clarke et al. ............... 379/230 |
| 6,240,067 B1 * | 5/2001 | Sorber ........................ 370/236 |
| 6,327,270 B1 * | 12/2001 | Christie et al. ............. 370/469 |
| 6,507,649 B1 * | 1/2003 | Tovander .................... 379/230 |

* cited by examiner

*Primary Examiner*—Chi Pham
*Assistant Examiner*—Thai Hoang
(74) *Attorney, Agent, or Firm*—Fleshner & Kim, LLP

(57) ABSTRACT

A method of processing congestion conditions of a MTP user part in the SS7 network is disclosed. According to the method, a congestion condition is identified, and information regarding the condition is transmitted in a MTP user part to an originating signaling point. The originating signaling point reduces traffic to be transmitted to the MTP user part of the congested destination, thereby preventing an interruption of service.

14 Claims, 3 Drawing Sheets

METHOD OF PROCESSING CONGESTION CONDITIONS OF MTP USER PART IN SS7 NETWORK

BACKGROUND OF THE INVENTION

1. Field of the Invention

The present invention relates to a common channel signaling network, and more particularly, to a method of processing congestion conditions of a user part of a message transfer part in a common channel signaling system No. 7 network.

2. Background of the Related Art

A common channel signaling (CCS) system is a signaling system in which a traffic line and a signaling line are managed separately to transmit a signal for a call through the signaling line. For purposes of example, a CCS system No. 7 (SS7) will be described as an exemplary CCS system.

FIG. 1 is a simplified diagram illustrating an example of the configuration of signaling points of a SS7 network. As shown in FIG. 1, the signaling points constituting the SS7 network are divided into signaling end points and signaling transfer points (STPs).

FIG. 2 is a simplified block diagram illustrating the protocol stack of each of the signaling points constituting the SS7 network.

The protocol stack includes a telephone user part (TUP) 1, an ISDN user part (ISUP) 3, a transaction capabilities part (TCP) 5, a signaling connection control part (SCCP) 7, and a message transfer part (MTP) 9.

The telephone user part (TUP) 1 is adapted to perform basic call processing to control a telephone call, control of an exchange connection of a call, etc. The ISDN user part (ISUP) 3 is adapted to perform functions necessary to provide a circuit switching service and an additional service in view of a preparation for a request of various kinds of services of an integrated services digital network (ISDN). The transaction capabilities part (TCP) 5 is adapted to perform a control of an exchange function and functions of special centers (e.g., a database, a special equipment unit, an operation and maintenance center) irrespective of a line. The signaling connection control part (SCCP) 7 is adapted to provide a transmission capability of a variety of signals or data except a typical line corresponding control signal, etc. Finally, the message transfer part (MTP) 9 is adapted to perform a transfer of a signal message.

The telephone user part (TUP) 1, ISDN user part (ISUP) 3, and signaling connection control part (SCCP) 7 are user parts (UPs) of the message transfer part (MTP) 9, and the transaction capabilities part (TCP) 5 is a user part (UP) of the signaling connection control part (SCCP) 7.

When comparing the MTP 9 with a 7-layered reference model of the Open System Interconnection (OSI) defined by the International Standard Organization (ISO), the lowest level or MTP level 1 of the MTP 9 is equivalent to the first layer of the OSI reference model or the physical layer. MTP level 2 of the MTP 9 is equivalent to the second layer of the OSI reference model or the data link layer. MTP level 3 of the MTP 9 is equivalent to the third layer of the OSI reference model or the network layer.

A signaling point that functions only to transfer a signal must have a protocol stack of the SCCP 7 and the ISUP 3.

The transfer of signaling messages of the MTP 9 in the SS7 network will now be described with reference to FIGS. 1 and 2.

As shown in FIGS. 1 and 2, for example, when assuming that a signaling message is transferred from a MTP user part of a signaling point A to a MTP user part of a signaling point F, the MTP user part of signaling point A requests a transfer of a signaling message to the MTP. The MTP routes the signaling message to an adjacent signaling point (B or C) through an available signal link set. At this time, the adjacent signaling point (B or C) receives the signaling messages from signaling point A, and routes the received signaling message to signaling point F which is a final destination signaling point. In the meantime, signaling point F receives the signaling message from the signaling point (B or C) and transfers the received signaling message to a MTP user part of signaling point F when a corresponding MTP user thereof is available.

Next, a transfer operation of a signaling message from a MTP level to a MTP user part of each signaling point will be described hereinafter.

As shown in FIG. 3, the MTP of signaling point F receives a signaling message from an adjacent signaling point, and transfers the received signaling message to a signaling message discrimination unit 10. The signaling message discrimination unit 10, in turn, determines whether or not signaling point F is the final destination signaling point of the received signaling message. If it is determined that the destination signaling point of the received signaling message is signaling point F to which the signaling message discrimination unit 10 itself belongs, the signaling message discrimination unit 10 sends the received signaling message to a signaling message distribution unit 30 to transfer it to a corresponding MTP user part of signaling point F. On the other hand, if it is determined that the destination signaling point of the received signaling message is not signaling point F to which the signaling message discrimination unit 10 itself belongs, the signaling message discrimination unit 10 transfers the received signaling message to a signaling message routing unit 20 to route the message to a corresponding signaling point.

Meanwhile, if signaling point F is the destination signaling point of the received signaling message, the signaling message distribution unit 30 receives the signaling message from the signaling message discrimination unit 10, and checks only an existence and an activation state of the corresponding MTP user part of signaling point F when performing a signaling message distributing function to determine whether to transfer the received signaling message to the corresponding MTP user part.

The related art signaling message has various problems. For example, when distributing the signaling message, the signaling message distribution unit 20 does not manage congestion conditions of the corresponding MTP user part. Accordingly, when the corresponding MTP user part of the destination signaling point is congested, the MTP of the destination signaling point and MTP user parts of other signaling points cannot recognize that congestion has occurred in the corresponding MTP user part of the destination signaling point. Accordingly, a MTP user part of the originating destination signaling point continues to transfer the signaling message to the destination signaling point F. The MTP of the destination signaling point also continues to transfer the signaling message to the MTP user part of the destination signaling point, so that the congestion conditions of the corresponding MTP user part of the destination signaling point continue during a predetermined period of time, which results in a complete interruption of a specific service.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method of processing a signaling message in a SS7 network that substantially obviates problems caused by disadvantages in the related art.

It is another object of the present invention to provide a method of processing congestion conditions of a MTP user part in a SS7 network.

It is another object of the present invention to provide a method of processing congestion conditions of a MTP user part in a SS7 network, in which when a MTP of a destination signaling point performs a signaling message distributing function, the MTP recognizes that congestion has occurred in a specific MTP user part of the destination signaling point, and informs an originating signaling point of a corresponding signaling message that congestion has occurred in the specific MTP user part.

It is another object of the present invention to provide a method of processing a signaling message in a SS7 network that reduces signal traffic to be transmitted to a specific MTP user part when congestion has occurred.

It is another object of the present invention to provide a method of processing a signaling message in a SS7 network that prevents an interruption of a specific service when congestion has occurred.

In order to achieve at least these objects in whole or in parts, there is provided a method of processing congestion conditions of a MTP user part in the SS7 network, comprising (a) defining a user part congested (UPC) message to inform that a congestion has occurred in a MTP user part of a destination signaling point for a signaling message to be transferred and a MTP_STATUS primitive to reduce the number of the signaling messages to be transmitted to the MTP user part where the congestion has occurred; (b) generating the UPC message, and transmitting the generated UPC message to an originating signaling point of the signaling message when a MTP of the destination signaling point recognizes congestion conditions of the MTP user part of the destination signaling point are recognized; and (c) receiving the UPC message to generate the MTP_STATUS primitive, and transmitting the generated MTP_STATUS primitive to a MTP user part of the originating signaling point to request the MTP user part of the originating signaling point to reduce the number of the signaling messages to be transmitted to the MTP user part of the destination signaling point where the congestion has occurred.

In order to achieve at least these objects in whole or in parts, there is further provided a method of processing congestion conditions of a MTP user part in the SS7 network, comprising informing an originating signaling point that a congestion has occurred in a MTP user part of a destination signaling point for a signaling message to be transferred when a MTP of the destination signaling point recognizes the congestion conditions of the MTP user part of the destination signaling point; and allowing a MTP of the originating signaling point being informed of the congestion conditions of the MTP user part of the destination signaling point to request a corresponding MTP user part of the originating signaling point to reduce the number of the signaling messages to be transmitted to the MTP user part of the destination signaling point where the congestion has occurred.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
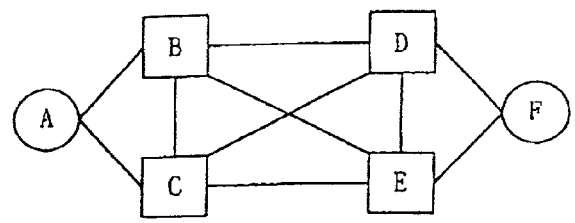
FIG. 1 is a simplified diagram illustrating an example of a related art configuration of signaling points of a SS7 network.
Figure 2:
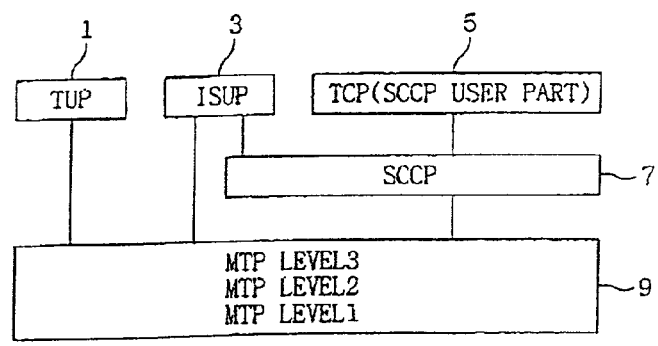
FIG. 2 is a simplified block diagram illustrating the protocol stack of each of the signaling points constituting the related art SS7 network.
Figure 3:
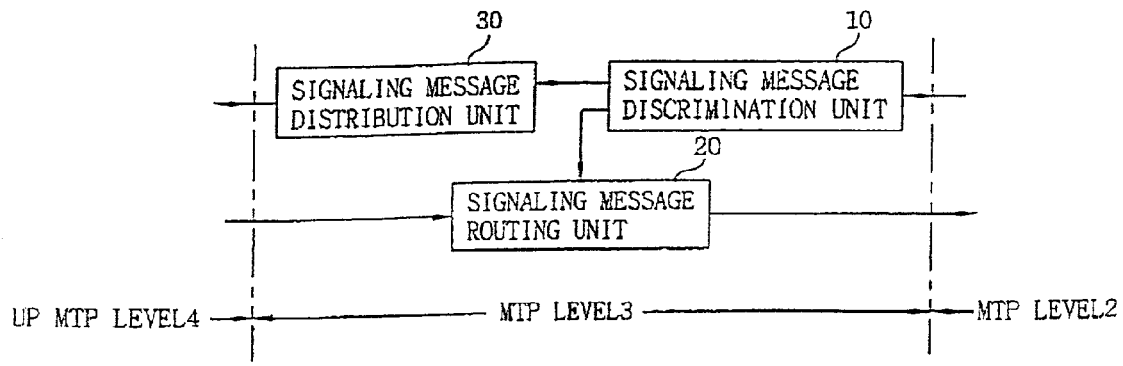
FIG. 3 is a simplified block diagram illustrating a MTP level of a signaling point.

The configuration of the SS7 network to which a method of processing congestion conditions of a MTP user part according to the preferred embodiment of the present invention is applied is similar to that of the related art. Accordingly, the preferred method of processing congestion conditions will be described with reference to FIG. 1.

First, to implement a method of processing congestion conditions of a MTP user part in a SS7 network according to the preferred embodiment, both a user part congested (UPC) message and a MTP_STATUS primitive are defined in the system. The UPC message is generated from a destination signaling point to inform an originating signaling point that congestion has occurred in a MTP user part of the destination signaling point for a signaling message to be transferred. The MTP_STATUS primitive is generated from the originating signaling point to reduce the number of the signaling messages to be transmitted to the congested MTP user part of the destination signaling point.

The destination signaling point transmits the UPC message to the originating signaling point at a certain signaling message interval to inform the originating signaling point that congestion has occurred in the MTP user part of the destination signaling point. The UPC message is preferably sent when a MTP of the destination signaling point in the SS7 network must transfer a signaling message to the MTP user part of the destination signaling point where the congestion has occurred. When a MTP of the originating signaling point receives the UPC message from the destination signaling point, it informs a MTP user part of the originating signaling point of the congestion in the MTP user part of the destination signaling point. Then the MTP_STATUS primitive is generated based on each parameter value included in the UPC message so as to reduce the number of signaling messages to be transmitted to the congested MTP user part of the destination signaling point.

A basic format of the UPC message conforms to Q.704 recommendation of the International Telecommunication Union-Telecommunication Standardization sector (ITU-T), and is expressed as shown in the following [Table 1].

TABLE 1

| Conges-tion Level | User Part ID | Spare | Desti-nation Code | H1 | H0 | Routing Label |
|---|---|---|---|---|---|---|
| 4 bits | 4 bits | 2 bits | 14 bits | 4 bits | 4 bits | 32 bits |

A routing label includes information for the UPC message to be routed. Heading code H1 and heading code H0 include a coding value representing the UPC message, which uses values that are not used among values predefined by the Q.704 recommendation of the ITU-T.

A destination point code represents a code of a signaling point to which the MTP user part where a congestion has occurred belongs.

A user part ID represents information about a user part for a signaling message to be transferred and transmitted. A coding for the user part ID is expressed as shown in the following [Table 2].

TABLE 2

| Bits | | | | |
|---|---|---|---|---|
| D | C | B | A | |
| 0 | 0 | 0 | 0 | Spare |
| 0 | 0 | 0 | 1 | Spare |
| 0 | 0 | 1 | 0 | Spare |
| 0 | 0 | 1 | 1 | SCCP |
| 0 | 1 | 0 | 0 | Telephone User Part |
| 0 | 1 | 0 | 1 | ISDN User Part |
| 0 | 1 | 1 | 0 | Data User Part (call and circuit related message) |
| 0 | 1 | 1 | 1 | Data User Part (facility registration and cancellation messages) |
| 1 | 0 | 0 | 0 | Reserved for MTP Testing User Part |
| 1 | 0 | 0 | 1 | Broadband ISDN User Part |
| 1 | 0 | 1 | 0 | Satellite ISDN User Part |
| 1 | 0 | 1 | 1 | Spare |
| 1 | 1 | 0 | 0 | Spare |
| 1 | 1 | 0 | 1 | Spare |
| 1 | 1 | 1 | 0 | Spare |
| 1 | 1 | 1 | 1 | Spare |

A congestion level represents a degree of congestion conditions. The level is expressed as shown in the following [Table 3].

TABLE 3

| Bit-4 | Cause |
|---|---|
| 0000 | congestion level 0 (uncongested) |
| 0001 | congestion level 1 |
| 0010 | congestion level 2 |
| 0011 | congestion level 3 |

A detailed parameter of the MTP_STATUS primitive is expressed as shown in the following [Table 4].

TABLE 4

| specific name | | Parameter(s) | |
|---|---|---|---|
| Indication | APC | Bit-4 | affected DPC |
| | Cause | Byte(1) | cause parameter |
| | Level | Byte(1) | Congestion level |

Here, the affected destination user point code (APC) represents a code of a signaling point of the congested MTP user part. "Cause" is a parameter denoting the cause that a destination signaling point transmits as part of the UPC message to an originating signaling point. The detailed contents of the Cause parameter are shown in the following [Table 5]. Particularly, as shown in Table 5, a coding value for user part congested has been added to the parameter.

"Level" represents the congestion level when the parameter, i.e., the Cause, indicates congestion conditions of a corresponding user part (i.e., "user part congested (UPC)"). Level has a value ranging from 0–3(0:uncongested). Level also represents the congestion level when the parameter, i.e., the Cause, indicates congestion conditions of a signaling network (i.e., "signaling network congested").

TABLE 5

| Cause | byte(1) | 1: signaling network congested |
|---|---|---|
| | | 2: user part unavailable (unknown) |
| | | 3: user part unavailable (unequipped user) |
| | | 4: user part unavailable (inaccessible remote user) |
| | | 5: user part congested |

A method of processing congestion conditions of a MTP user part in the SS7 using the UPC message and the MTP_STATUS primitive as defined above is described next.

Figure 4:
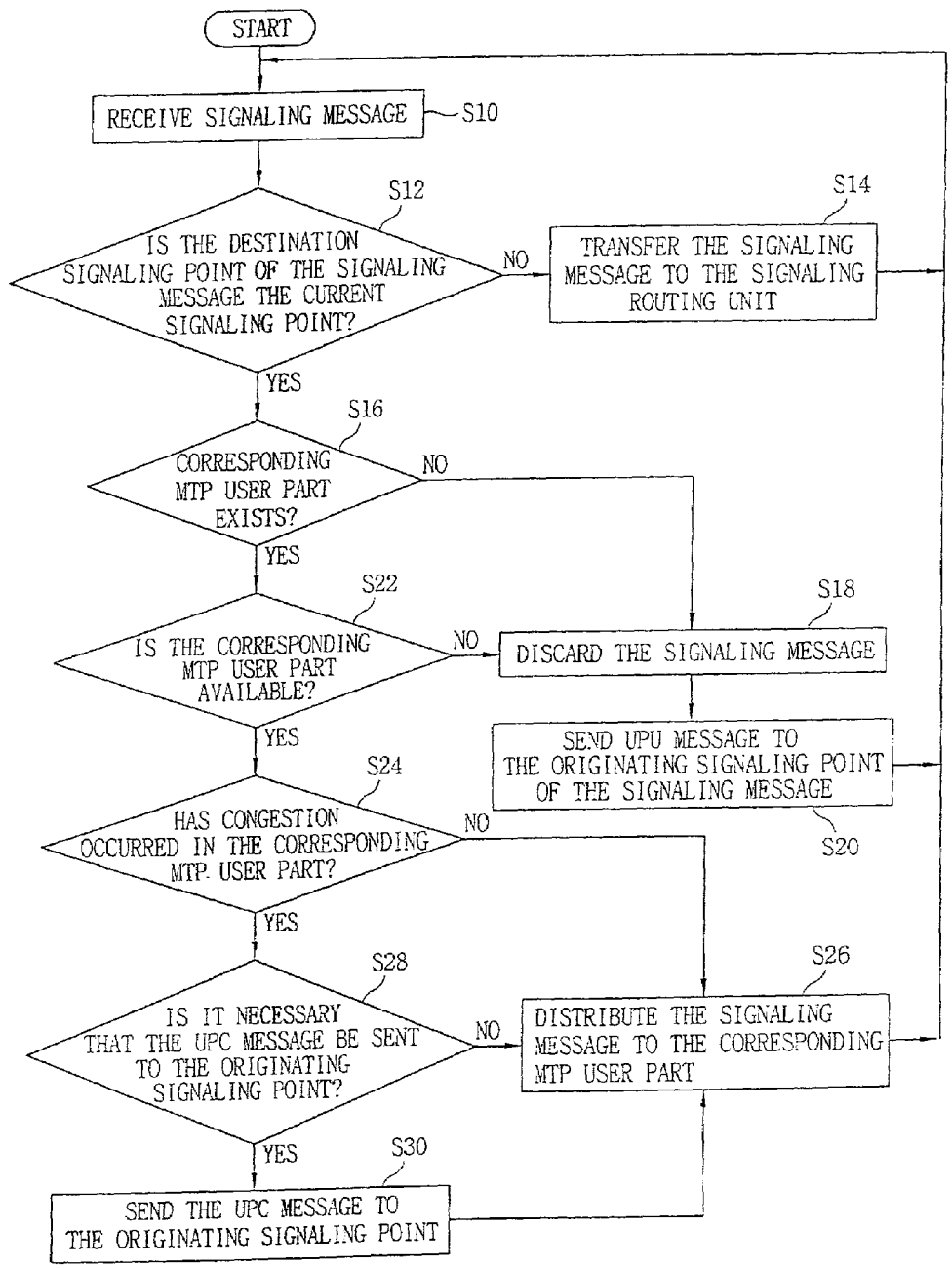
FIG. 4 is a flowchart illustrating a process routine for processing congestion conditions of a MTP user part of a destination signaling point in the SS7 network according to the preferred embodiment of the present invention.

First, a UPC message transmitting method will be described with reference to FIG. 4. FIG. 4 is a flowchart illustrating a routine for processing congestion conditions of a MTP user part of a destination signaling point in the SS7 network according to the preferred embodiment.

Referring to FIG. 4, a signaling message discrimination unit 10 of a MTP signaling point first receives a signaling message to be transferred to a MTP user part from a MTP user part of an adjacent signaling point in the SS7 network step (S10). Next, at step S12, the signaling message discrimination unit 10 determines whether or not a destination signaling point of the received signaling message is the signaling point to which the signaling message discrimination unit 10 itself belongs.

If it is determined at step S12 that the destination signaling point of the received signaling message is not the signaling point to which the signaling message discrimination unit 10 itself belongs, the process proceeds to step S14, where the signaling message discrimination unit 10 transfers the received signaling message to a signaling message routing unit 20. The signaling message routing unit 20 then routes it to a corresponding signaling point.

On the other hand, if it is determined at step S12 that the destination signaling point of the received signaling message is the signaling point to which the signaling message discrimination unit 10 belongs, the process proceeds to step S16. At step S16, the signaling message discrimination unit 10 sends the received signaling message to a signaling message distribution unit 30 to transfer it to a corresponding MTP user part of the destination signaling point to which the signaling message discrimination unit 10 itself belongs.

At this time, the signaling message distribution unit 30 determines whether or not a corresponding MTP user part exists for the received signaling message to be transferred step (S16). If it is determined at step S16 that no corresponding MTP user part exists for the received signaling message to be transferred, the routine proceeds to step S18, where the signaling message distribution unit 30 discards the received signaling message. Then, at subsequent step S20, the signaling message distribution unit 30 transmits a UPU (User Part Unavailable) message to an originating signaling point of the discarded signaling message indicating that a corresponding MTP user part of the destination signaling point does not exist.

If, on the other hand, it is determined at step S16 that the corresponding MTP user part exists for the received signaling message to be transferred, the process proceeds to step S22, where the signaling message distribution unit 30 determines whether or not the corresponding MTP user part is available. If it is determined at step S22 that the corresponding MTP user part is not available, the program proceeds again to step S18, where the signaling message distribution unit 30 discards the received signaling message. Then, at subsequent step S20, the signaling message distribution unit 30 transmits the UPU message to the originating signaling point of the discarded signaling message indicating that the corresponding MTP user part of the destination signaling point is not available.

If, however, it is determined at step S22 that the corresponding MTP user part is available, the process proceeds to step S24, where the signaling message distribution unit 30 determines whether or not the corresponding MTP user part is congested. If it is determined at S22 that the corresponding MTP user part is not congested, the method proceeds to step S26, where the signaling message distribution unit 30 transfers the received signaling message to the corresponding MTP user part.

On the other hand, if it is determined at S22 that the corresponding MTP user part is congested, the program proceeds to step S28, where the signaling message distribution unit 30 determines whether or not it is necessary to transmit the UPC message to the originating signaling point of the received signaling message.

The purpose of determining whether or not it is necessary to transmit the UPC message to the originating signaling point of the received signaling message is to reduce the number of the UPC messages transmitted to the originating signaling point. That is, a UPC message is transmitted to the originating signaling point of the received signaling message each time the signaling message distribution unit 30 transfers the received signaling message to the corresponding congested MTP user part. It is preferable, however, that only one UPC message be transmitted per a predetermined number of signaling messages transferred to the corresponding congested MTP user part. The predetermined number of the signaling messages is preferably set high enough to inform the originating signaling point that congestion has occurred in the corresponding MTP user part of the destination signaling point, but without applying a load to the SS7 network. Also, the count of the predetermined number of the signaling messages is preferably reset when the UPC message is transmitted to the originating signaling point.

In the meantime, if it is determined at step S28 that it is not necessary to transmit the UPC message to the originating signaling point of the received signaling message, the method proceeds to step S26, where the signaling message distribution unit 30 transfers the signaling message to the corresponding MTP user part. On the other hand, if it is determined at step S28 that it is necessary to transmit the UPC message to the originating signaling point of the received signaling message, the program proceeds to step S30, where the signaling message distribution unit 30 transmits the UPC message to the originating signaling point of the received signaling message. Then, at step S26, the signaling message distribution unit 30 transfers the signaling message to the corresponding MTP user part. Accordingly, when the MTP of the destination signaling point recognizes that congestion has occurred at the MTP user part of the destination signaling point, it transmits the UPC message to the originating signaling point of the received signaling message indicating that congestion has occurred in the MTP user part of the destination signaling point.

Figure 5:
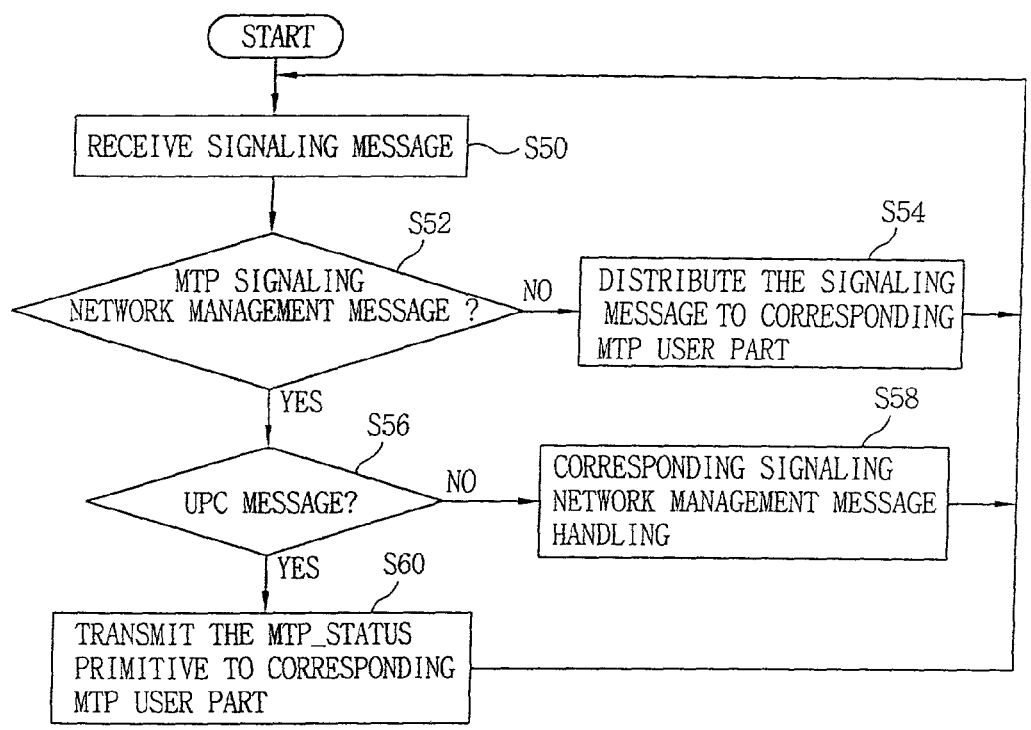
FIG. 5 is a flowchart illustrating a process routine for processing congestion conditions of a MTP user part of an originating signaling point in the SS7 network according to the present invention.

A UPC message receiving method will next be described with reference to FIG. 5. FIG. 5 is a flowchart illustrating a routine for processing congestion conditions of a MTP user part of an originating signaling point in the SS7 network, according to the preferred embodiment.

Referring to FIG. 5, a MTP of the originating signaling point first receives the UPC message from an adjacent signaling point at step S50. Next, at step S52, the MTP of the originating signaling point determines whether or not the signaling message received by the MTP of the originating signaling point is a MTP signal network managing message. The SIO (Service Information Octet) parameter which is positioned at the front of the routing label among the parameters of the signaling message (not shown in [Table 1]), will indicate whether or not the received signaling message is the MTP signal network managing message.

If it is determined at step S52 that the received signaling message is not the MTP signal network managing message, the routine proceeds to step S54, where the MTP of the originating signaling point transfers the signaling message to a corresponding MTP user part. On the other hand, if it is determined at step S52 that the received signaling message is the MTP signal network managing message, the program proceeds to step S56, where the MTP of the originating signaling point determines whether or not the received signaling message is the UPC message.

If it is determined at step S56 that the received signaling message is not the UPC message, the program proceeds to step S58, where the MTP of the originating signaling point processes a conventionally defined MTP signal network managing message. If, on the other hand, it is determined at step S56 that the received signaling message is the UPC message, the routine proceeds to step S60, where the MTP of the originating signaling point generates the MTP_STATUS primitive based on each of the parameter values included in the UPC message. The generated MTP_STATUS primitive is then transmitted to a corresponding MTP user part of the originating signaling point.

At this time, the MTP user part of the originating signaling point reduces the number of signaling messages to be transmitted to the MTP user part of the destination signaling point where the congestion has occurred. The amount of reduction is based on the MTP user part of the congested destination signaling point, the congestion level of the MTP user part, etc., which parameters are included in the MTP_STATUS primitive. Accordingly, the congestion condition in the MTP user part of the destination signaling point is reduced, thereby preventing an interruption of a specific service.

Next, a process of generating the MTP_STATUS primitive from the MTP of the originating signaling point using the UPC message transmitted to the MTP of the originating signaling point from the MTP of the destination signaling point will be described.

First, when the MTP of the originating signaling point receives the UPC message from the destination signaling point, it fills an APC parameter of the MTP_STATUS primitive with a destination parameter value of the UPC message. Also, the MTP of the originating signaling point fills a Cause parameter of the MTP_STATUS primitive with a coding value representing the cause for the destination signaling point to transmit the UPC message to the MTP of the originating signaling point. It also fills a Level parameter of the MTP_STATUS primitive with a congestion level parameter value of the UPC message The MTP_STATUS primitive is thus generated.

The method of processing congestion conditions of a MTP user part in the SS7 network of the present invention has many advantages. For example, when a MTP of a destination performs a distribution of a signaling message, it recognizes the congestion conditions of specific MTP user parts of the destination signaling point, and transmits information about the congestion conditions in the MTP user part to an originating signaling point of a corresponding signaling message. This reduces a signal traffic to be transmitted to the MTP user part of the destination signaling point where the congestion has occurred, thereby preventing an interruption of a specific service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of processing congestion conditions of a MTP user part in a SS7 network, comprising:
   (a) defining a user part congested (UPC) message that indicates when congestion has occurred in a MTP user part of a destination signaling point, and a MTP_STATUS primitive to reduce a number of the signaling messages to be transmitted to the congested MTP user part;
   (b) generating the UPC message in the destination signaling point, and transmitting the generated UPC message to an originating signaling point of the signaling message when a MTP of the destination signaling point recognizes congestion conditions of the MTP user part of the destination signaling point; and
   (c) generating the MTP_STATUS primitive, and transmitting the generated MTP_STATUS primitive to a MTP user part of the originating signaling point to request the MTP user part of the originating signaling point to reduce the number of the signaling messages to be transmitted to the congested MTP user part of the destination signaling point; and wherein (b) comprises:
   (d) determining whether or not a destination signaling point of a signaling message transmitted from an adjacent signaling point is the signaling point to which the MTP belongs when the corresponding MTP receives the signaling message from the adjacent signaling point;
   (e) determining whether or not a MTP user part exists for the received signaling message to be transferred if the destination signaling point of the received signaling message is the signaling point to which the MTP belongs;
   (f) determining whether or not the MTP user part of the destination signaling point is congested, if the MTP user part for the received signaling message to be transferred exists and the MTP user part is available;
   (g) determining whether or not it is necessary for the MTP of the destination signaling point transmit the UPC message to the originating signaling point of the received signaling message, if the MTP user part of the destination signaling point is congested; and
   (h) transmitting the UPC message to the originating signaling point if it is determined that it is necessary that the MTP of the destination signaling point transmit the UPC message to the originating signaling point.

2. The method of claim 1, wherein (g) comprises:
   (i) determining whether or not the signaling message transferred to the congested MTP user part includes a prescribed number of the signaling messages; and
   (j) transmitting one UPC message to the originating signaling point if it is determined that the signaling messages transferred to the MTP user part include the prescribed number of signaling messages.

3. The method of claim 2, wherein (j) further comprises deciding not to transmit the UPC message to the originating signaling point if it is determined that the signaling messages transferred to the MTP user part do not include the prescribed number of signaling messages.

4. The method of claim 2, wherein the prescribed number of signaling messages is set to a level such that the originating signaling point is informed that congestion has occurred in the MTP user part of the destination signaling point without applying a load to the SS7 network.

5. The method of claim 1, wherein (f) further comprises:
   discarding the received signaling message and transmitting a UPU message indicating that the MTP user part of the destination signaling point is not available to the originating signaling point of the discarded signaling message, if it is determined that the MTP user part for the received signaling message to be transferred does not exist or is not available.

6. A method of processing congestion conditions of a MTP user part in a SS7 network, comprising:
   (a) defining a user part congested (UPC) message that indicates when congestion has occurred in a MTP user part of a destination signaling point, and a MTP STATUS primitive to reduce a number of the signaling messages to be transmitted to the congested MTP user part;
   (b) generating the UPC message, in the destination signaling point, and transmitting the generated UPC message to an originating signaling point of the signaling message when a MTP of the destination signaling point recognizes congestion conditions of the MTP user part of the destination signaling point; and
   (c) generating the MTP STATUS primitive, and transmitting the generated MTP STATUS primitive to a MTP user part of the originating signaling point to request the MTP user part of the originating signaling point to reduce the number of the signaling messages to be transmitted to the congested MTP user part of the destination signaling point, wherein (c) comprises:

(k) determining whether or not a signaling message received by the MTP of the originating signaling point is a MTP signal network managing message;

(l) determining whether or not the received signaling message is the UPC message, if the received signaling message is the MTP signal network managing message;

(m) generating the MTP_STATUS primitive based on the UPC message, if the received signaling message is the UPC message;

(n) transmitting the generated MTP_STATUS primitive to the MTP user part of the originating signaling point to request the MTP user part of the originating signaling point to reduce the number of the signaling messages to be transmitted to the congested MTP user part of the destination signaling point; and (o) reducing the number of the signaling messages to be transmitted from the MTP user part of the originating signaling point to the congested MTP user part of the destination signaling point.

7. The method of claim 6, wherein (m) comprises:

(p) generating a signaling point code of the MTP_STATUS primitive using a destination parameter of the UPC message; and (q) generating a congestion level of the MTP_STATUS primitive using a congestion level parameter value of the UPC message.

8. A method of processing congestion conditions of a MTP user part in a SS7 network, comprising:

(a) informing an originating signaling point that congestion has occurred in a MTP user part of a destination signaling point for a signaling message when a MTP of the destination signaling point recognizes the congestion conditions of the MTP user part of the destination signaling point; and (b) reducing a number of signaling messages to be transmitted from a MTP of the originating signaling point to the MTP user part of the congested destination signaling point in response to a request for reduction from a corresponding MTP user part of the originating signaling point, wherein (a) comprises:

(c) determining whether or not the congestion has occurred in the MTP user part of the destination signaling point for the signaling message to be transferred;

(d) determining whether or not it is necessary to inform the originating signaling point of the signaling message of the congestion conditions of the MTP user part of the destination signaling point, if the MTP user part of the destination signaling point is congested;

(e) transmitting a message having a prescribed format to the originating signaling point indicating that congestion has occurred in the MTP user part of the destination signaling point, if it is determined that it is necessary to inform the originating signaling point of the signaling message of the congestion conditions.

9. The method of claim 8, wherein the prescribed message format comprises a congestion level, representing a degree of the congestion conditions, a user part ID, representing information about the MTP user part for the signaling message to be transferred, and a signaling point code, representing a signaling point to which the congested MTP user part belongs.

10. The method of claim 9, wherein the signaling point code is a destination point code.

11. The method of claim 8, wherein (d) comprises:

(f) determining whether or not the signaling message transferred to the congested MTP user part includes a prescribed number of signaling messages;

(g) deciding to transmit the message having the prescribed format to the originating signaling point of the received signaling message if it is determined that the signaling message transferred to the MTP user part includes the prescribed number of the signaling messages; and (h) deciding not to transmit the message having the prescribed format to the originating signaling point of the received signaling message if the signaling message transferred to the MTP user part does not include the prescribed number of signaling messages.

12. The method of claim 11, wherein the prescribed number of signaling messages is set to a level such that the originating signaling point is informed that congestion has occurred in the MTP user part of the destination signaling point without applying a load to the SS7 network.

13. The method of claim 11, wherein the prescribed number of signaling messages is reset when the MTP of the destination signaling point transmits the message having the prescribed format to the originating signaling point.

14. The method of claim 8, wherein (a) further comprises:

determining whether or not a destination signaling point of a signaling message transmitted from an adjacent signaling point is the signaling point to which the MTP itself belongs when the corresponding MTP receives the signaling message from the adjacent signaling point;

determining whether or not a MTP user part exists for the received signaling message to be transferred, if the destination signaling point of the received signaling message is the signaling point to which the MTP itself belongs; and determining whether or not the MTP user part for the received signaling message to be transferred is available, if the MTP user part exists.

* * * * *